June 17, 1952 W. T. McMAHON 2,600,560

STATIC FREQUENCY CHANGER

Filed June 16, 1951

INVENTOR
W. T. McMAHON
BY H. A. Burgess
ATTORNEY

Patented June 17, 1952 2,600,560

UNITED STATES PATENT OFFICE 2,600,560

STATIC FREQUENCY CHANGER

William T. McMahon, Madison, N. J., assignor to Bell Telephone Laboratories, Incorporated, New York, N. Y., a corporation of New York Application June 16, 1951, Serial No. 231,991

4 Claims. (Cl. 321—69)

This invention relates to an audible tone generator of a type adapted particularly for use in a telephone system for transmitting an audible tone to a calling subscriber to indicate that a called subscriber's station is being rung.

Objects of the invention are simplicity of construction with reduced cost, improved load capacity and increased flexibility.

A feature of the invention is a static frequency changer of few parts that requires no maintenance.

The present invention is an alternative to the tone generator disclosed in Wrathall Patent 2,234,213, March 11, 1941, and represents a simplification thereof, using fewer parts.

Figure 1:
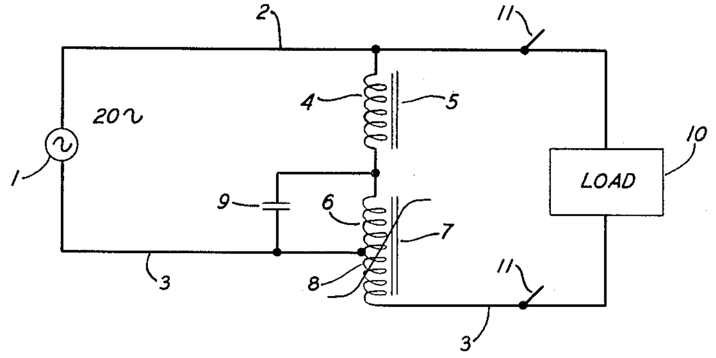
Figure 2:
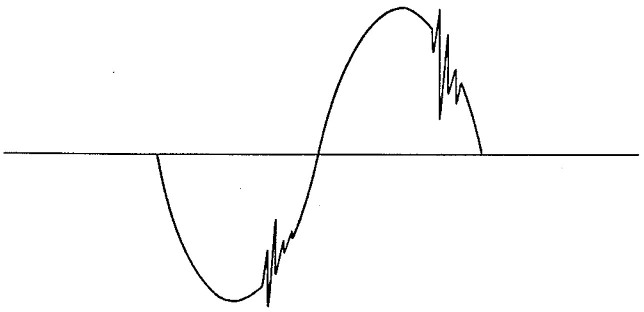

The nature and objects of the invention will be more fully understood from the following detailed description taken in connection with the accompanying drawings in which:

Fig. 1 is a schematic diagram of a circuit incorporating the invention and Fig. 2 shows a typical wave form produced by this circuit.

In Fig. 1 a source of 20 cycles per second ringing current is shown at 1 adapted to be connected to a called subscriber line during a ringing period. The switching circuits for making the connection to the subscriber line may be similar to those shown in the patent referred to, but for purposes of present disclosure the source 1 is shown as actually connected to load 10 by way of line wires 2 and 3. While the load 10, which typically may be the ringer in a called line, is actuated by 20 cycle current, it is desired to produce audible tone modulations on this current which can be heard by the calling subscriber whose line is also connected across conductors 2 and 3 during ringing periods, in the manner shown in the patent.

The audible tone is produced by means of inductance coils having cores indicated at 5 and 7 and windings indicated at 4, 6 and 8. A capacity 9 is also connected across winding 6.

Inductance 4, 5 is a linear coil operating below saturation at all values of normally applied current, while inductance 6, 7, 8 is a non-linear coil worked along the portion of its magnetization curve where the permeability is changing rapidly in each half cycle of applied current, preferably above the knee of the magnetization curve. When so worked, the non-linear coil produces a highly distorted voltage wave form containing all the odd harmonics of the supply frequency extending over a wide range from 60 cycles well up into the audible range. Condenser 9 provides a means of adjustment of the voltage across winding 6, and it is chosen or adjusted to the right value to resonate or partially resonate with inductance 6 at the frequency of the desired tone so as to accentuate it. For example the twenty-first multiple is a 420 cycle frequency which is suitable for the ring-back tone.

Winding portion 8 comprises a few turns at the end of winding 6, these turns being connected in series in the lower line wire 3, so as to impress the 420 cycle tone directly on the line circuit 2, 3, superposed on the 20 cycle current.

The shape of the voltage wave in line 2, 3 is illustrated in Fig. 2, where one complete cycle of the 20 cycle wave is shown, with the tone modulation superposed on it. The modulations occur on the sloping part of the supply wave between its zero intercept and its maximum or peak value. Condenser 9 in shunt to winding 6 aids in phasing the tone modulations relative to the 20 cycle supply wave to bring the modulations at the sloping portions of the fundamental wave instead of at the peaks.

It will be observed that the tone producer in accordance with the invention consists of but few parts, resulting in low construction cost and in spaced economy. It has been found to handle twice the load of an existing type consisting of more parts and occupying the same space, and the quality and level of the tone produced are substantially constant from no load to full load; also no resistor is required to discharge the condenser 9 when for any reason the set is disconnected from the circuit. In other tone generator circuits it is necessary to provide for discharge of the condenser under these conditions to protect personnel working on the circuit from possibility of shock.

One reason for the high load capacity is that the shunt circuit consisting of the two coils and condenser shunts comparatively little of the 20 cycle current. The inductance of the linear coil 4, 5 remains sufficient to prevent excessive shunting even though the inductance of non-linear coil 6, 7 falls to low value during portions of each half cycle.

The number of turns in the portion 8 can be varied to give the desired amount of modulation with a minimum of background noise.

The output or load side of the tone producer will ordinarily be multipled to other loads as indicated at 11, 11.

The invention is not to be construed as limited to the details disclosed in connection with the description nor to values cited by way of example, but is capable of variation and adaptation within the scope and spirit of the invention.

What is claimed is:

1. A static tone generator for producing audible modulation of sub-audible frequency current comprising in combination with a sub-audible frequency wave source and load circuit and an interconnecting line therebetween, a circuit in bridge of said line comprising a linear inductance and non-linear inductance in series with each other, the latter proportioned in relation to the applied wave to operate well into its saturation region in each half of the applied wave to generate multiple frequency waves, a capacity across said non-linear coil to emphasize production of multiple frequency waves in a selected frequency range, and additional turns on the core of said non-linear coil, said additional turns comprising a small fraction of the total winding on said core and connected in series in one side of said line.

2. A static frequency changer for superposing on a base frequency wave components of multiple frequency comprising in combination with a source of base frequency waves and a load circuit, a linear inductance and a non-linear inductance connected in series with each other across the terminals of said load circuit, one terminal of said source being connected to a terminal common to said non-linear inductance and said load, the other terminal of said source being connected to a tap on said non-linear inductance at a point removed from its point of connection to said load by a small fraction of the total number of turns in said non-linear coil, whereby said small fractional number of turns are included in series between the source and load, and a condenser connected across the remaining portion of the non-linear inductance and proportioned in relation thereto to emphasize production of said multiple frequency components.

3. A static frequency changer for superposing on a base frequency wave components of multiple frequency comprising in combination with a source of base frequency waves and a load circuit, a two-wire line extending between the terminals of said source and the terminals of said load, a linear inductance, a non-linear inductance having a tap point near one end so as to divide the total winding into one section comprising the major portion and another section comprising only a small fraction of the total number of turns in said winding, said linear inductance and said major portion of the winding of said non-linear inductance being connected in series with each other across said line, a condenser connected across said major portion of said winding and proportioned in relation thereto to emphasize production of multiple frequency components in a desired range, said small fractional number of turns being included in series relation in one side of said line.

4. A static frequency changer comprising a linear inductance, a non-linear inductance having one end of its winding connected to one end of said linear inductance, and forming a common point, a tap point in the winding of said non-linear inductance near the end of the winding remote from said common point, said tap point and the other end of said linear inductance adapted for connection to an input source of base frequency alternating current, a load circuit connected across the two ends of said inductances remote from the common point and a condenser connected across the portion of said winding of said non-linear inductance that is included between said tap and said common point, said condenser being proportioned in relation to the inductance of said included portion of said winding to accentuate the production of currents having desired frequencies which are multiples of said base frequencies.

WILLIAM T. McMAHON.

REFERENCES CITED

The following references are of record in the file of this patent:

UNITED STATES PATENTS

| Number | Name | Date |
|---|---|---|
| 1,877,703 | Suits | Sept. 13, 1932 |
| 2,088,619 | Stocker | Aug. 3, 1937 |
| 2,234,213 | Wrathall | Mar. 11, 1941 |